(12) United States Patent
Kunesh (10) Patent No.: US 12,233,993 B1
(45) Date of Patent: Feb. 25, 2025

(54) FLOATING POWER GENERATION SYSTEM

(71) Applicant: Robert J Kunesh, Carson, CA (US)

(72) Inventor: Robert J Kunesh, Carson, CA (US)

( * ) Notice: Subject to any disclaimer, the term of this patent is extended or adjusted under 35 U.S.C. 154(b) by 0 days.

(21) Appl. No.: 18/764,696

(22) Filed: Jul. 5, 2024

Related U.S. Application Data (60) Provisional application No. 63/621,112, filed on Jan. 16, 2024.

(51) Int. Cl.
| | | |
|---|---|---|
| *F03B 13/00* | (2006.01) | |
| *B63B 35/44* | (2006.01) | |
| *F03B 13/10* | (2006.01) | |
| *F03B 13/12* | (2006.01) | |

(52) U.S. Cl.
CPC .............. *B63B 35/44* (2013.01); *F03B 13/00* (2013.01); *F03B 13/10* (2013.01); *F03B 13/12* (2013.01); *B63B 2035/4453* (2013.01); *B63B 2035/446* (2013.01); *B63B 2035/4466* (2013.01); *F05B 2210/11* (2013.01); *F05B 2260/421* (2013.01)

(58) Field of Classification Search
CPC ............ B63B 35/44; B63B 2035/4453; B63B 2035/446; B63B 2035/4466; F03B 13/00; F03B 13/10; F03B 13/12; F05B 2210/11; F05B 2260/421
See application file for complete search history.

(56) References Cited

U.S. PATENT DOCUMENTS

| | | | | |
|---|---|---|---|---|
| 3,995,972 A | * | 12/1976 | Nassar | F03D 5/06 416/241 A |
| 4,184,805 A | * | 1/1980 | Arnold | F03D 5/06 416/64 |
| 4,347,036 A | * | 8/1982 | Arnold | F03D 5/06 416/64 |
| 4,915,584 A | * | 4/1990 | Kashubara | F03D 5/06 416/64 |
| 5,548,956 A | * | 8/1996 | Price | F03B 17/06 60/369 |
| 6,273,680 B1 | * | 8/2001 | Arnold | F03D 9/12 416/64 |
| 6,323,563 B1 | * | 11/2001 | Kallenberg, Jr. | F03B 17/067 290/43 |
| 6,652,232 B2 | * | 11/2003 | Bolduc | F03B 17/06 416/DIG. 4 |

(Continued)

FOREIGN PATENT DOCUMENTS

| | | | | |
|---|---|---|---|---|
| CA | 2824713 A1 | * | 3/2012 | ............ F03B 13/10 |
| WO | WO-2012036900 A2 | * | 3/2012 | ............ F03B 13/10 |

*Primary Examiner* — Pedro J Cuevas (57) ABSTRACT

A floating power generation system incorporates a scotch yoke mechanism that is coupled with an electrical generator to produce power and is actuated by a fin assembly having a plurality of fins that move or pivot from a first pivot position to a second pivot position. The fins are coupled with the yoke of the scotch yoke by a cable to move the yoke back and forth in a reciprocating motion. As the fins move back and forth from one side of the water flow direction to the other, the yoke reciprocates and turns the flywheel to produce electrical power. The floating power generation system may employ two fin assemblies, wherein a first fin assembly directs water through the plurality of first fins into the plurality of second fins of the second fin assembly to force the second fins in an opposing pivot orientation from said first fins.

22 Claims, 9 Drawing Sheets

(56) References Cited

U.S. PATENT DOCUMENTS

| | | | |
|---|---|---|---|
| 7,311,496 B1* | 12/2007 | Steinbrecher | F03B 17/00 415/906 |
| 7,632,069 B2* | 12/2009 | Kelley | F03D 9/28 415/4.2 |
| 8,102,071 B2 | 1/2012 | Catlin | |
| 8,152,441 B2 | 4/2012 | Hoffman | |
| 8,278,776 B1* | 10/2012 | Arntz | F03D 5/00 290/54 |
| 8,439,641 B2* | 5/2013 | Steinberg | F03D 13/25 416/117 |
| 8,469,663 B2* | 6/2013 | Kerr | F03D 5/00 416/64 |
| 8,657,575 B2* | 2/2014 | Morris | F03D 5/06 416/79 |
| 8,772,957 B2 | 7/2014 | Willingham | |
| 8,901,767 B2 | 12/2014 | Krouse | |
| 8,916,987 B2* | 12/2014 | Schultz | F03B 13/10 290/53 |
| 9,163,607 B2 | 10/2015 | Tabe | |
| 9,291,147 B2* | 3/2016 | Jones | F03B 17/06 |
| 9,464,623 B2* | 10/2016 | Liu | F03D 7/00 |
| 9,494,129 B2* | 11/2016 | Ko | F03B 13/264 |
| 9,562,434 B2* | 2/2017 | Liu | F03B 13/10 |
| 9,624,907 B2* | 4/2017 | Shelke | F03B 17/062 |
| 9,732,724 B1* | 8/2017 | Burke | F03B 13/264 |
| 10,151,294 B2 | 12/2018 | Fan | |
| 11,149,716 B2* | 10/2021 | Zheng | F03D 9/25 |
| 11,555,478 B2* | 1/2023 | Sheng | B63B 77/10 |
| 2007/0297903 A1* | 12/2007 | Morris | F03D 5/06 290/55 |
| 2010/0045046 A1* | 2/2010 | Douglas | F03B 13/16 320/101 |
| 2010/0143115 A1* | 6/2010 | Kerr | F03D 5/00 416/1 |
| 2012/0121414 A1* | 5/2012 | Steinberg | F03D 3/067 416/17 |
| 2012/0235417 A1* | 9/2012 | Arntz | F03D 5/00 416/64 |
| 2013/0285384 A1* | 10/2013 | Schultz | F03B 17/06 290/54 |
| 2013/0341934 A1* | 12/2013 | Kawanishi | F03D 9/007 290/55 |
| 2014/0230421 A1* | 8/2014 | Shelke | F03D 9/28 60/398 |
| 2014/0322012 A1* | 10/2014 | Steinberg | F03D 3/067 416/17 |
| 2018/0212432 A1 | 7/2018 | Byrnes | |
| 2019/0128241 A1* | 5/2019 | Achard | F03D 3/04 |
| 2020/0354022 A1 | 11/2020 | Moffat et al. | |
| 2021/0003112 A1* | 1/2021 | Allinson | F03D 9/25 |
| 2021/0025369 A1* | 1/2021 | Zheng | B63B 35/44 |
| 2022/0325697 A1* | 10/2022 | Sheng | F03B 13/182 |

\* cited by examiner

FLOATING POWER GENERATION SYSTEM

CROSS REFERENCE TO RELATED APPLICATIONS

This application claims the benefit of priority to U.S. provisional patent application No. 63/621,112, filed on Jan. 16, 2024; the entirety of which is hereby incorporated by reference herein.

BACKGROUND OF THE INVENTION

Field of the Invention

The invention relates a floating power generation system, a hydrokinetic generator system that utilizes a scotch yoke coupled to a generator and powered by a plurality of fins, hydrofoils, that oscillate back and forth by a flow of water therethrough.

Background

There is an every increasing need for electrical power. Hydrokinetic power generation systems are starting to be used more frequently to produce power and these systems are typically secured to a fixed supporting structure. Therefore, when waves become large due to storms, or the water flow rates become excessive high or turbulent, these power system can become damaged or may break away from their supports.

SUMMARY OF THE INVENTION

An exemplary floating power generation system incorporates a scotch yoke mechanism that is coupled with an electrical generator to produce power and is actuated by a fin assembly having a plurality of fins that are at least partially submerged in water and move or pivot from a first pivot position to a second pivot position that is on an opposing side of a water flow direction. The fins are coupled to a scotch yoke, such as by a cable, that turns the flywheel of the scotch yoke that is coupled with a generator to produce power. The floating power generation system may be free-floating and not affixed to a fixed support relative to the water flow, wherein the floating power generation system can move with respect to land or fixed a support, such as a pylon(s). A free-floating power generation system may be secured to a fixed support by cables or other flexible supports.

A scotch yoke is a reciprocating motion mechanism, that converts linear motion of a yoke into rotational motion, or vice versa. The fins are coupled with the yoke, such as by a cable, to move the yoke back and forth in a reciprocating motion. The yoke has a yoke slot, and a flywheel connector, such as a pin, that is coupled to a flywheel and moves within the yoke slot to rotate the flywheel. The location of the flywheel connector versus time is simple harmonic motion. As the fins move back and forth from one side of the water flow direction to the other, the yoke reciprocates and turns the flywheel to produce electrical power.

The floating power generation system may employ two or more fin assemblies, wherein a first fin assembly directs water through the plurality of first fins into the plurality of second fins of the second fin assembly to force the second fins in an opposing pivot orientation from said first fins. A first fin assembly may be configured upstream of the second fin assembly, with respect to the water flowing under or through the floating power generation system. Each fin assembly may be coupled with a separate scotch yoke and each may be coupled an electrical generator or the rotation of the two flywheels may mechanically combine to power a single electrical generator.

An adjustable fin angle in contact with water flow may be used as an actuator in contact with the water flow and acts in moving the fin assembly coupled to the scotch yoke in turning the flywheel and may have a belt and pulley connected to the electric generator. The moving of a rail of a fin assembly may initiate the reciprocating motion of the plurality of fins from a first pivot position to a second pivot position. As the fins pivot from a first pivot position to a second pivot position, the water flow forces the fins to a preset pivot angle and this angle may be adjusted as a function of the water flow rate. Higher or faster water flow rates may require a lower pivot angle from the water flow direction than slower water flow rates. The pivot angle from a water flow direction to either side of said water flow direction may be about 30 degrees or an inclusive pivoting angle of 60 degrees from a first pivot position to a second pivot position. The inclusive pivot angle may be about 20 degrees or more, about 30 degrees of more, about 40 degrees or more, about 50 degrees or more, about 60 degrees or more, about 70 degrees or more, about 80 degrees or more, or even about 90 degrees or more and any range between and including the values provided. A larger inclusive pivot angle may be used when the water flow rate is relatively slow, or about 60 m/min or less, about 40 m/min or less, about 30 m/min or less, and a smaller inclusive angle may be used when the water flow rate is higher, such as about 80 m/min or more, about 120 m/min or more, about 1900 m/min or more, or even 240 m/min or more, and any range between and including the flow rates provided. The water flow rate may be from about 30 m/min to about 60 m/min for initial start up and may go up to about 240 m/min.

The electric generator may be coupled to each or both of the two flywheels by a belt, gear or cable connector resulting in flywheel movement acted upon and forced by the fins pivoting from a first pivot position to a position where the water flow forces the fins to the opposing second pivot position. As the water forces the fins to this second pivot position, the flywheel is forced to spin by the pin moving in the yoke slot.

An exemplary fin assembly may have a plurality of fins, such as about two or more, three or more, five or more, ten or more, twenty or more and any range between and including the number of fins provided. The fins are coupled to a sliding rail frame in an exemplary embodiment, the fins are configured between a first rail and second rail that extend above and below the fins. The first rail and second rail may be coupled together by a vertical rail to form a frame around the fins. The fins may be pivotably connected to the first rail and second rail and an actuating rail may be coupled to the fins whereby movement of the actuating rail pivots the fins with respect to the first and second rail. The actuating rail may move the fins in unison and may be coupled to an actuator, such as an electric generator. The electric generator may also be coupled to a battery that is charged by the generator. A small amount of water flow will be able to initiate the fins to move to an opposing side of the water flow and then power is generated as the fin is forced to one side by the water flow. Also, a fin may be coupled to a single support rail, the first and/or second rail.

Each fin may have a surface area of about 0.5 m² or more, about 1 m² or more, about 2 m² or more about 5 m² or more, about 10 m² or more. The larger the area, the more power may be produced when the FINS are forced from one position to another.

A fin may have a height from a top to a bottom that is about 0.5 m or more, to about 0.75 m or more, about 1 m or more, about 2 m or more, about 5 m or more, about 10 m or more and any range between an and including the height values provided. A fin may have a length from a front to a back that is about 0.5 m or more, to about 0.75 m or more, about 1 m or more, about 2 m or more, about 5 m or more, about 10 m or more and any range between an and including the height values provided. The fins may be completely submerged or may be partially submerged wherein a portion of the fin is configured below a surface of the water. A substantial portion of the fin may be submerged such as about 50% or more of the fin height, about 75% or more, about 85% or more, about 90% or more and any range between and including the percentages provided.

The fins may be coupled with a yoke cable that is coupled to the sliding yoke of the scotch yoke. A yoke cable may be coupled with a portion of the fin assembly, such as the actuating rail for example. Again, the reciprocating motion of the fins and the yoke cable spin the flywheel to produce electrical power. As the fins move back and forth across the water flow direction, the yoke moves back and forth across the flywheel and spins the flywheel. The yoke cable may extend in a loop around the floating platform and be coupled to opposing sides of the yoke.

One or more water baffles may be configured to direct water flow into and through the plurality of fins and these baffles may extend from the floating power generation system on either end of the plurality of fins from the end of the floating platform. The baffles will be configured in the water in use and may angle outward in opposing direction from the floating platform to direct water under the floating platform and through the fins.

The floating platform may taper in dimension such that a water receiving surface directed waves or wave energy down under the floating platform to prevent impact from waves on the floating platform and to increase current flows through the fins under the floating platform. The wave angle of a water incident face may be about 30 degrees or more from vertical, about 45 degrees or more from vertical, about 60 degrees from vertical or any range between and including the angles provided.

The floating power generation system may incorporate other power generation systems or devices such as a wind turbine system and/or a solar power system that includes one or more photovoltaic cells or panels. In an exemplary embodiment a wind turbine is coupled to the floating platform and has turbine blades that spin about a vertical axis to spin a vertically oriented turbine shaft. A plurality of turbine baffles may direct wind into the wind turbine to increase electrical power production. A solar power system may incorporate one or more solar panels coupled to the floating platform and they may be configured above or on top of the wind turbine. One or more of the solar panels may be configured to actuate or pivot to increase exposure to the sun and/or to direct and increase wind intensity into the wind turbine. A controller may be configured to determine if pivoting for wind power production or pivoting for solar power production is more productive. At night the solar panels may be pivoted for increased wind power production and may direct wind into the wind turbine. A central solar panel may be configured directly over the wind turbine and one or more additional solar panels may extend from the side, or top side, of the wind turbine and may be configured to actuate or pivot.

The fin assemblies may be lifted up out of the water enabling maintenance or needed repairs or in the event of high currents or a storm producing turbulent water that may damage the fins or other portions of the floating power generation system. Lifting or tilting actuators may employ a motor or crank mechanism to actuate the fin assemblies as well as the water baffles by rotation, tilting or lifting up into or along the floating platform towards the top of the platform, out of or substantially out of the water. The first and second rails may be moved along with the fins as well. The fin assemblies are pivoted up and out of the water in an exemplary embodiment by a support beam which may be configured on one or opposing sides of the floating platform. The fins and/or fin assemblies may be lifted out of the water completely or partially in conditions of high currents exceeding 9 mph or storm producing turbulent water which may damage the fins and the fin assemblies or over stress other components of the floating power generation system. The fin assembly may be pivoted out of the water by the fin support arm that may pivot the fin assembly and fins out of the water. Also, the actuating arm may be disengaged to allow the fins to return to a zero or neutral fin angle in riding out these over-limit current flows.

The fin assemblies may also be configured to release from the fin-yoke cable or the cable may be configured to go slack to allow the fins to move back and forth without damaging components of the system. The actuating rail may be decoupled from the fin frame assembly as well to prevent damage. The fins may freely move back and forth with the flow of the water during turbulent currents to avoid damage.

A neutral position wherein the fin is aligned with the water flow direction and wherein momentum of movement is caused by a change of fin angle and will cause the fin to move from said neutral position to an opposing POWERED PIVOT FIN position.

An electrical generator, as used herein, produces electricity or electrical power and may generate electricity by the slow to high rotation of a magnetic armature enclosed in a shell of field wiring.

The summary of the invention is provided as a general introduction to some of the embodiments of the invention and is not intended to be limiting. Additional example embodiments including variations and alternative configurations of the invention are provided herein.

BRIEF DESCRIPTION OF SEVERAL VIEWS OF THE DRAWINGS

The accompanying drawings are included to provide a further understanding of the invention and are incorporated in and constitute a part of this specification, illustrate embodiments of the invention, and together with the description serve to explain the principles of the invention.

The linear position of the first fin assembly is offset to the second fin assembly, allowing one fin assembly to be acted upon by the water flowing therethrough while the second fin assembly is in a dwell position and with the plurality of fins in reversing fin angles.

Corresponding reference characters indicate corresponding parts throughout the several views of the figures. The figures represent an illustration of some of the embodiments of the present invention and are not to be construed as limiting the scope of the invention in any manner. Some of the figures may not show all of the features and components of the invention for ease of illustration, but it is to be understood that where possible, features and components from one figure may be included in the other figures. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

DETAILED DESCRIPTION OF THE ILLUSTRATED EMBODIMENTS

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations, and improvements of the described embodiments, will occur to those skilled in the art and all such alternate embodiments, combinations, modifications, improvements are within the scope of the present invention.

Referring now to FIGS. 1 to 6, an exemplary floating power generation system 10 has a floating power generator 30 configured on a floating platform 31 with a first fin assembly 40 having a plurality of first fins 42 that are coupled with a fin-yoke cable 46 that spins a first flywheel 52 of the first scotch yoke 51, and the first generator shaft 54 to produce power. The first fin generator 50 has a yoke 53 that reciprocates back and forth to spin the first flywheel 52 by having a pin 57 extending from the flywheel into the first yoke slot 55. The water flow direction 16 is shown as a bold arrow. The force of the water will cause the fins of the first and second fin assembly to pivot from a first pivot position to a second pivot position to move the respective fin-yoke cable 46, 66 and in turn, move the respective yoke 53, 73 and produce power. The orientation of the first fins, as they move from one pivot orientation to another may direct the water flow into the second fins and force them to pivot and move the second fin-yoke cable 66. An actuator 58, such as a motor, may be required to move the first fins from a first position to a second position, or to a neutral position, wherein the force of water flowing thereby will take over and force the first fins to the opposing pivot position. The actuator may be a motor and may be a separate motor from the generator that is coupled with the flywheel or yoke-cable or rails, or it may be a motor/generator coupled to one or both of the first and second flywheels that acts as a generator to produce electrical power but that also acts as a motor to keep the flywheel(s) spinning when required. The net output will be positive electrical power production when a small amount of power is used to initiate movement of the fins.

Figure 1:
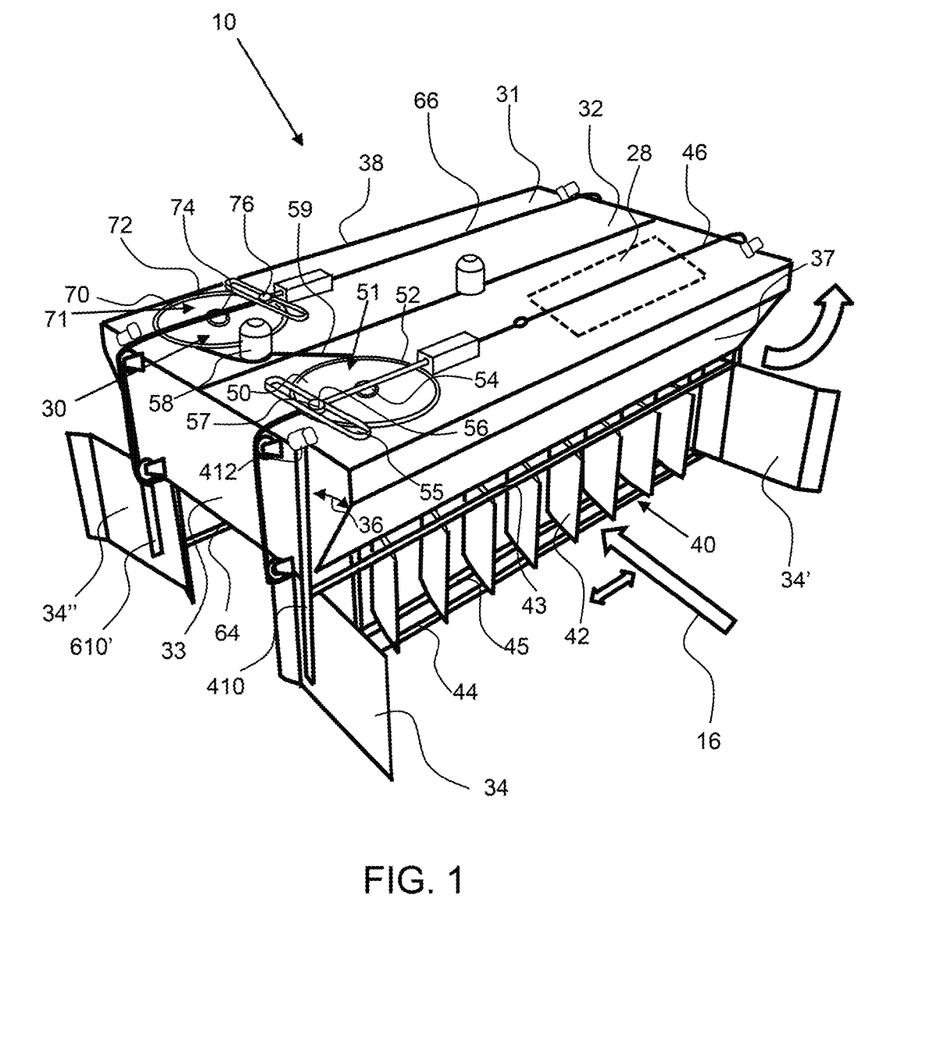
FIG. 1 shows an exemplary floating power generation system having a floating power generator with a lateral moving first fin assembly with a plurality of fins that are coupled with a fin-yoke cable that extends to a flywheel of a scotch-yoke, a linear to rotary converter mechanism, that produces flywheel movement that spins a generator shaft to produce power.

A first fin assembly 40 has a plurality of first fins 42 configured between a first rail 43 and second rail 44. An actuating rail 45 is coupled with each of the plurality of fins and moves back and forth as the fins move. The first fin-yoke cable 46 is coupled with the actuating rail and extends to the first flywheel 52 a scotch-yoke 51, having a first flywheel 52 with a first flywheel connector 56, such as a pin 57, that moves along the perimeter of the flywheel, and within the yoke slot 55 to spin the first flywheel 52 and the generator shaft 54. The first flywheel 51 of the first scotch-yoke 51 is coupled with the first fin generator 50 to produce power. The flywheel is coupled with a generator and rotation of a component of the flywheel produces power by said generator.

Figure 5:
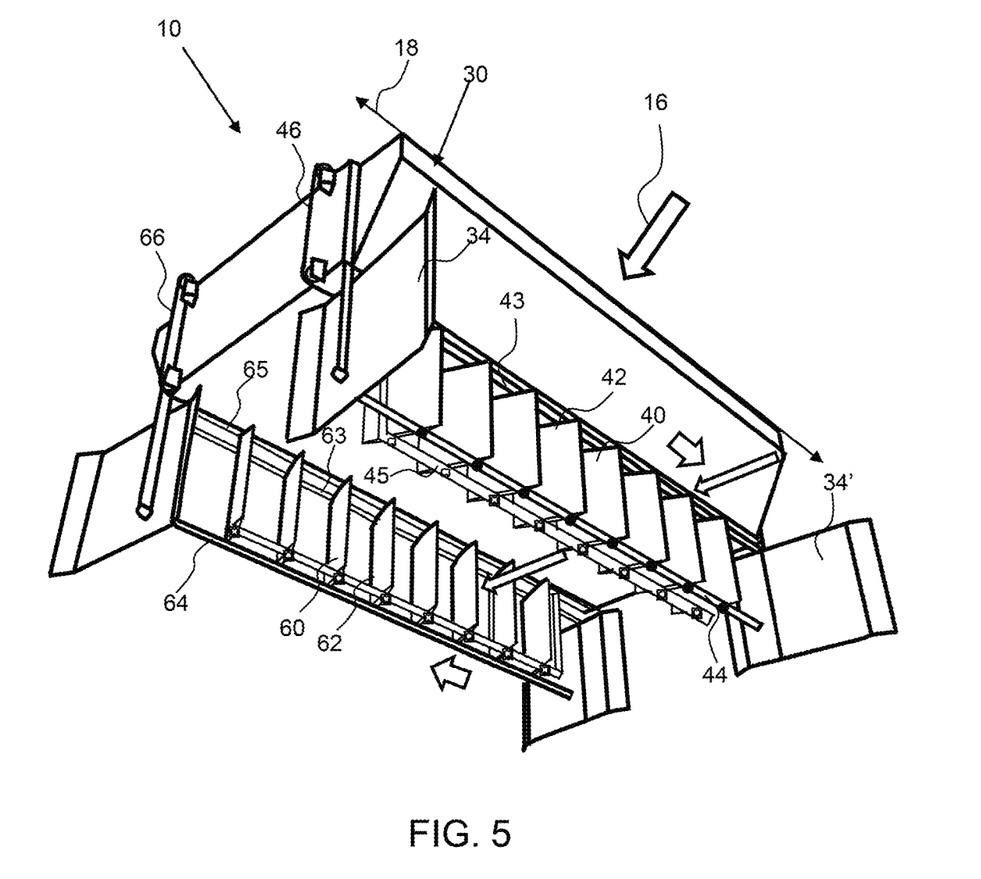
FIG. 5 shows the underside of the floating power generator shown in FIGS. 1 to 4, with two sets of fin assemblies, each coupled with a separate fin-yoke cable and configured to rotate a separate flywheel to spin a generator to produce power.
Figure 6:
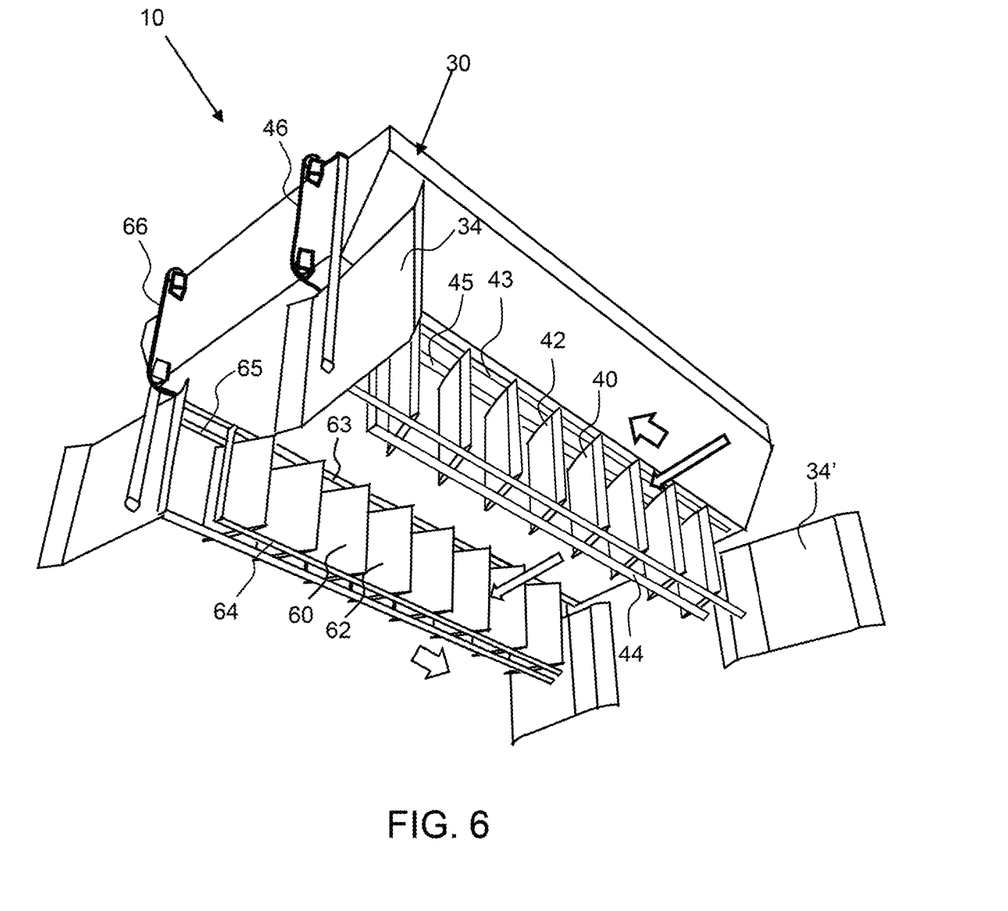
FIG. 6 shows the underside of the floating power generator shown in FIGS. 5, with two sets of fin assemblies, configured in opposing offset pivot positions, wherein the flow of water as directed from a first fin assembly will force movement from the second fin assembly from a dwell point to movement in the opposite direction of the second rudder assembly continuing rotational power to the generator.

A second fin assembly 60 has a plurality of second fins 62 configured between a first rail 63 and second rail 64 (shown in FIGS. 5 and 6). An actuating rail 65 is coupled with the second fin-yoke cable 66 that extends to the second fin generator 70, a second scotch-yoke 81, having a second flywheel 72 with a second flywheel connector 76 that moves along the perimeter of the flywheel to spin the flywheel shaft 74, a generator shaft. The flywheel is coupled with a generator and rotation of a component of the flywheel produces power by said generator.

Figure 2:
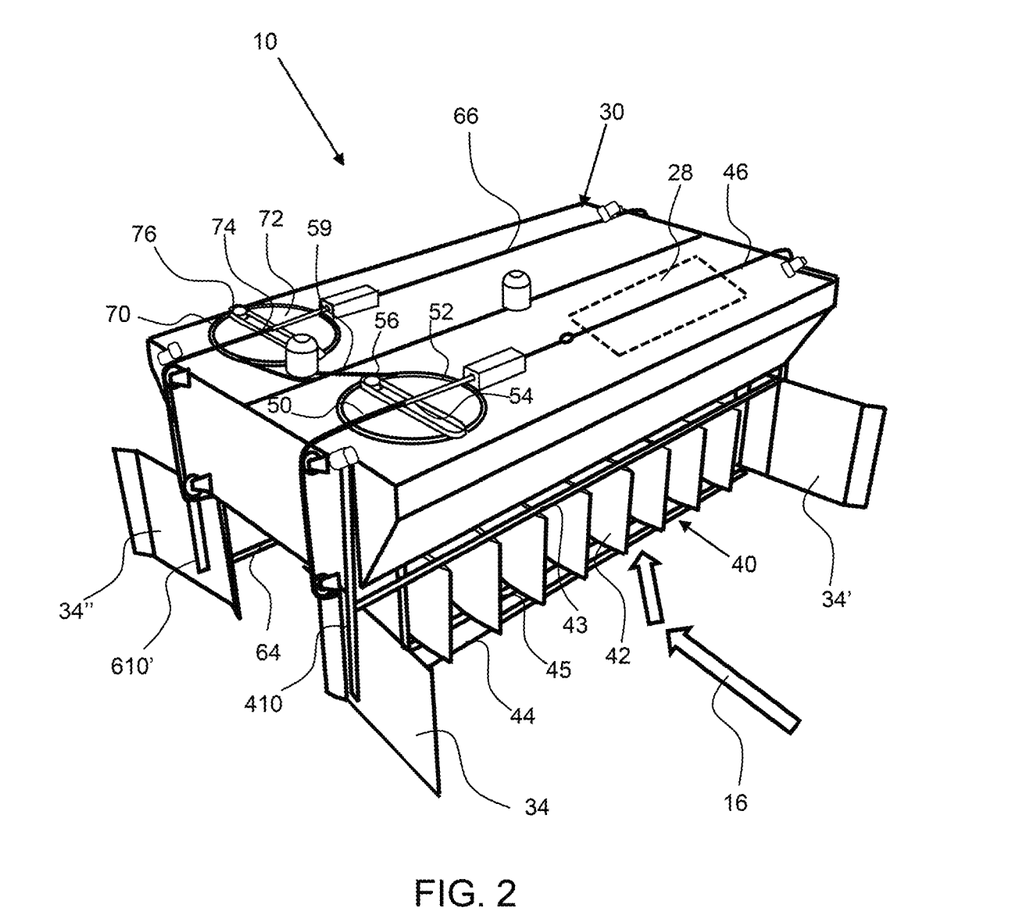
FIG. 2 shows the exemplary floating power generation system shown in FIG. 1 with the fins now moved to a first pivoted position, due to the flow of water through the fins that causes the fin-yoke cable to generate flywheel rotary movement to move and therefore spin the generator shaft and produce power.
Figure 3:
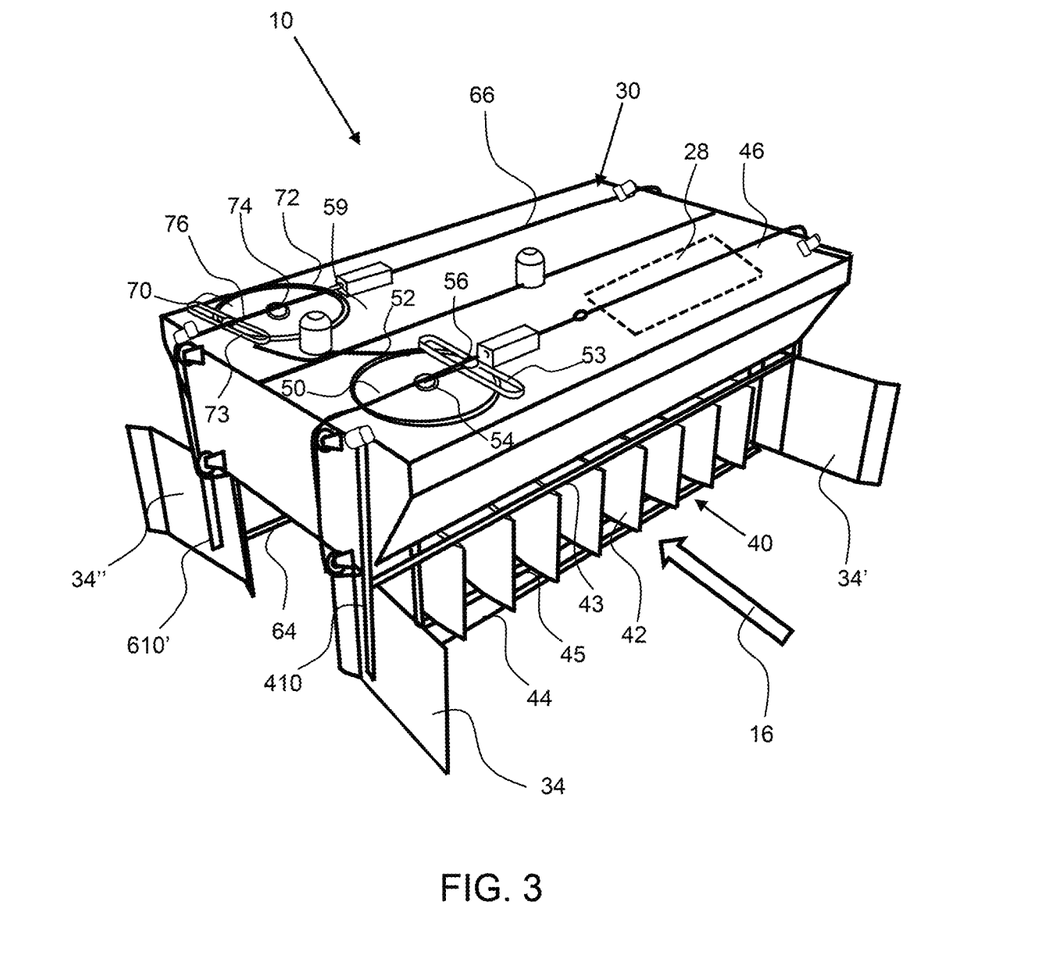
FIG. 3 shows the exemplary floating power generation system shown in FIG. 2 with the fins now moved to a neutral position, or substantially aligned with the water flow direction, or approximately in the middle of the inclusive pivot angle wherein the yokes are now in an opposite position with respect to the flywheels than as shown in FIG. 1.

As shown in FIG. 1, the first fins 42 are aligned with the water flow direction 16 and are in a neutral position centrally located between a first pivot position, shown in FIG. 2 and an opposite second pivot position. As shown in FIG. 2, the water flow is being directed along the fins along the first pivot angle under the floating platform and onto and through the second fins of the second fin assembly. As shown in FIG. 3, the fins have moved back to a neutral position. The actuator 58 is coupled to a cable connector 59, coupling the actuator, such as a motor to the flywheels, and the actuator may be used to initiate the moving the fins from the first pivot position to this neutral position and slightly past the neutral position toward the second pivot position at which point the flow of water will force the fins to the second pivot position. The actuating rail may move the fins in unison and may be coupled to an actuator 58, such as an electric motor. The electric motor may receive power generated by the generator 54 and may be coupled to a battery 28 that is charged by the generator.

Note the position of the yokes in FIGS. 1 to 3 and how the movement of the respective yokes causes the flywheels to rotate. Also note how the yoke position of the first fin generator 50 are opposite the yoke position of the second fin generator 70 in FIGS. 1 and 3.

A shown in FIG. 1, the floating platform 31 has a tapering body along both the first side 37 and second side 38, wherein the body tapers down into the water along a wave angle 36. This angled face of the floating platform will direct wave energy down under the floating platform. Also, a plurality of water baffles 34, 34', 34" are configured to direct water flow into the first fins and or second fins, depending on the direction of water flow.

The fin assemblies may be pivoted up out of the water by the fin assembly support arms 410, 610, as indicated by the bold curved arrow. The fin assembly support arms may be coupled to an actuator 412 that pivots the entire fin assembly, including the first rail, second rail and actuating rail out of the water. Also, the water baffles may also be coupled to the fin assembly support arm and be moved out of the water during times of high water flow rates or turbulent water flow. A fin assembly support arm may be configured on opposing ends 33, 35 of the floating platform 31. Actuators 412, 412' may be configured on each of the respective first end 33 and second end 35 of the floating platform 31 to pivot the first fin assembly 40 out of the water. An actuator may include a cable crank or a motor that moves the fin assembly support arms, such as by rotation of the motor shaft or hand crank about a pivot. As shown, the second fin assembly also has a fin assembly support arm 610 and actuators on opposing ends of the floating platform to pivot the second fin assembly 60 out of the water.

Figure 4:
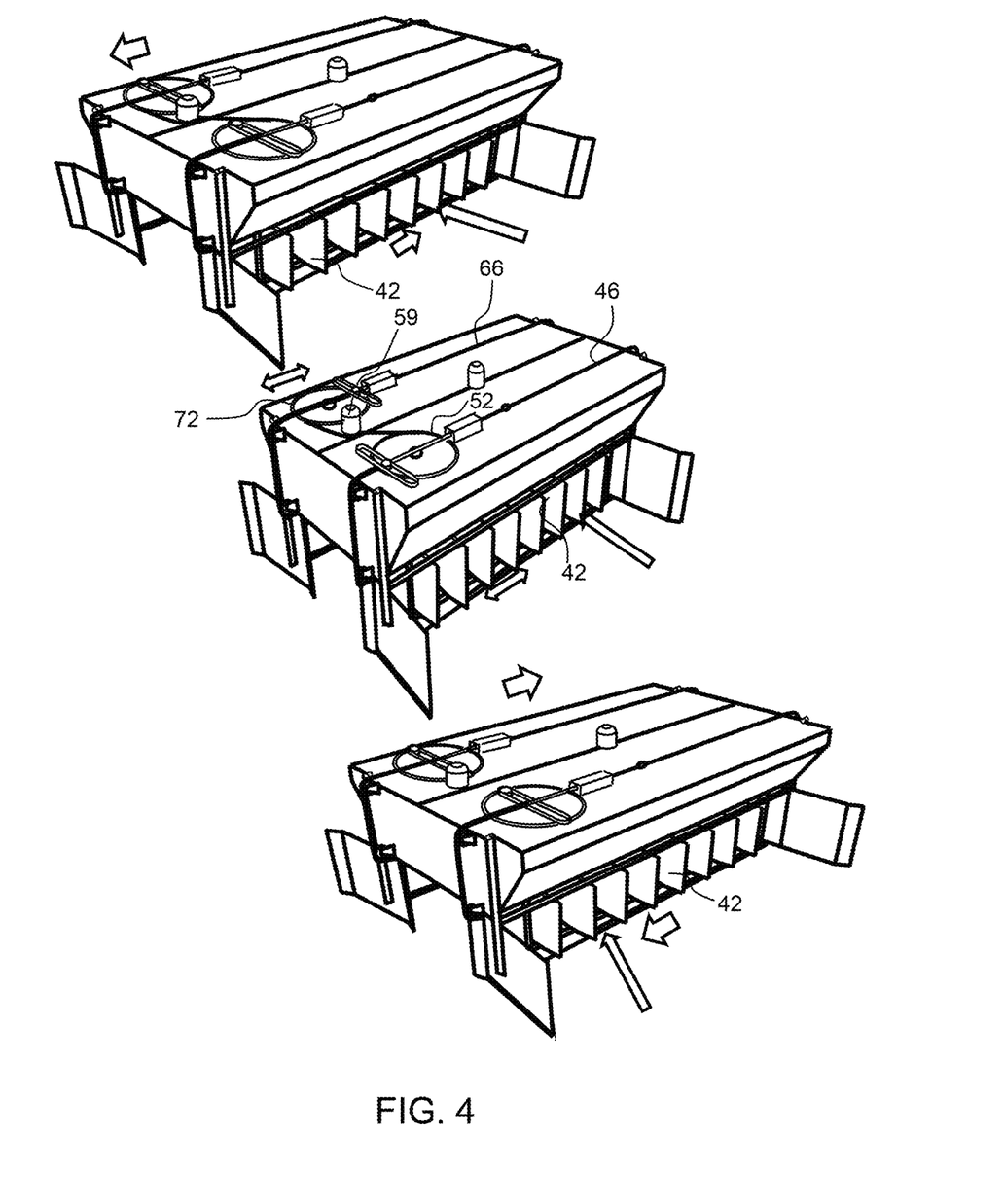
FIG. 4 shows the floating power generation system shown in FIGS. 1 to 3, in series so that the motion of the fins and flywheel from a first pivot position, to a neutral position to a second pivot position are clear.

With reference to FIG. 4, the first fins 42 move from a first pivot position, or angled position, to neutral, to a second pivot position, opposite the first pivot position. The short bold arrows indicate the direction of movement of the first fins 42. As the first fins move, the first flywheel 52 spins due to the first flywheel connector. Also, the second flywheel 72 is coupled to the first flywheel 52 by a cable connector 59, such that the rotation of the first flywheel spins the second flywheel. The flow of water through the first fins is indicated by the long bold arrows.

With reference to FIGS. 5 and 6, the motion of the first fins 42 with respect to the second fins 62 is shown, wherein the short bold arrows show the direction of movement of the fins and the long bold arrows indicate the direction of water flow through the fins. The flow of water through the first fins will force the second fins to move into a pivot position that is opposite the first fins. Also, a plurality of water baffles 34 are configured to direct water flow into the first fins and or second fins, depending on the direction of water flow. As described herein, the floating power generator 30 may be positioned in tidal water ways and as the tide comes in, the water may flow a first direction, such as from the first fin to the second fins and then when the tide is going out the direction of flow may change, wherein the water flows first through the second fins and then into the first fins.

Also shown in FIGS. 5 and 6 are the rails that retain the plurality of first fins 42 of first fin assembly 40 and plurality of fins 62 of the second fin assembly 60. As shown for the first fin assembly 40, the plurality of fins 42 are retained between the first rail 43 configured along the top of the fins and the second rail 44 extending along the bottom of the fins 42. The first rail and second rails may be coupled together to form a frame around the fins with a connector extending between the first rail and the second rail. An actuating rail 45 extends along and is coupled with the fins and moves relative to the first rail 43 and second rail 44 as the fins change fin angle. The actuator rail may be coupled with a motor or actuator to move the fins when required to initiate movement by the current from one side to the other. As shown for the second fin assembly 60, the plurality of second fins 62 are retained between the first rail 63 configured along the top of the second fins and the second rail 64 extending along the bottom of the second fins 62. An actuating rail 65 extends along and is coupled with the second fins and moves relative to the first rail 63 and second rail 64 as the second fins change fin angle. As shown, the first fin-yoke cable 46 is coupled with the actuating rail 45 and the second fin-yoke cable 66 is coupled with the second actuating rail 65. Each of the first yoke-cable and the second yoke-cable extend from the respective fin generator and are coupled with the fins, such as being coupled with the actuating rail and extends around the floating platform 31 along the width axis 18 of the floating platform, orthogonal to the water flow direction 16.

Figure 7:
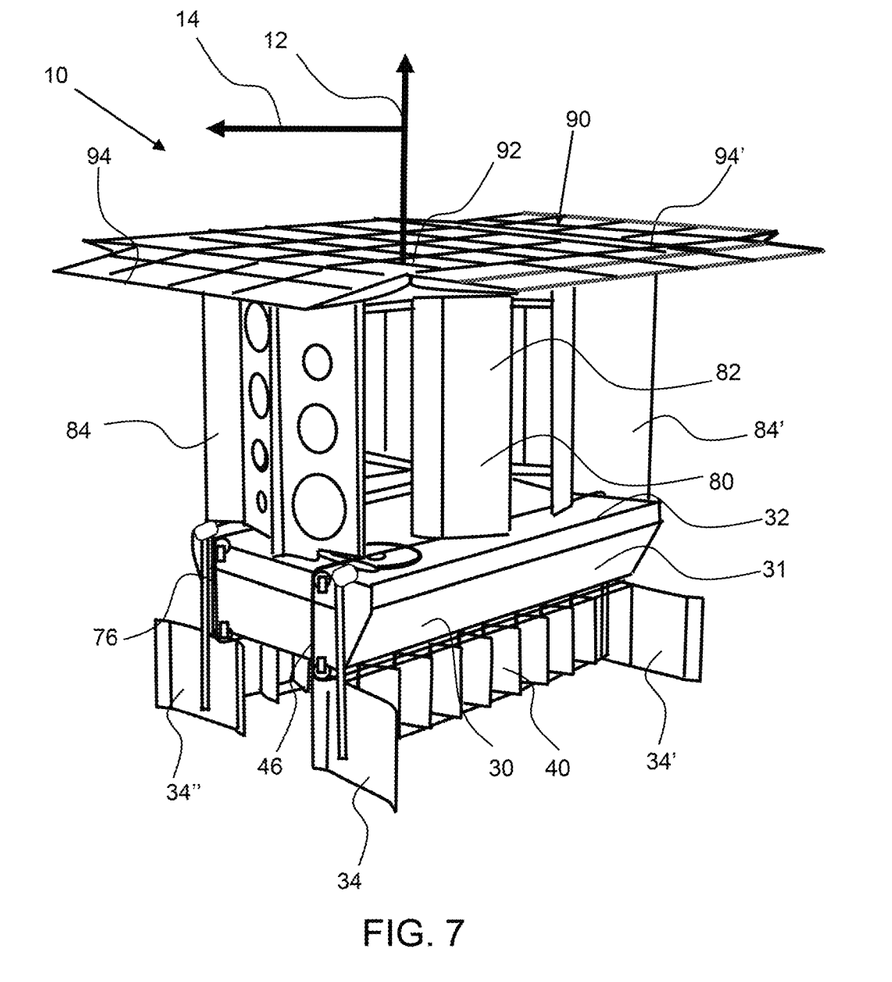
FIG. 7 shows the floating power generation system shown in previous FIGS., now with a wind turbine configured on the top side of the floating power generator and with a solar power system; both configured to produce electrical power.
Figure 8:
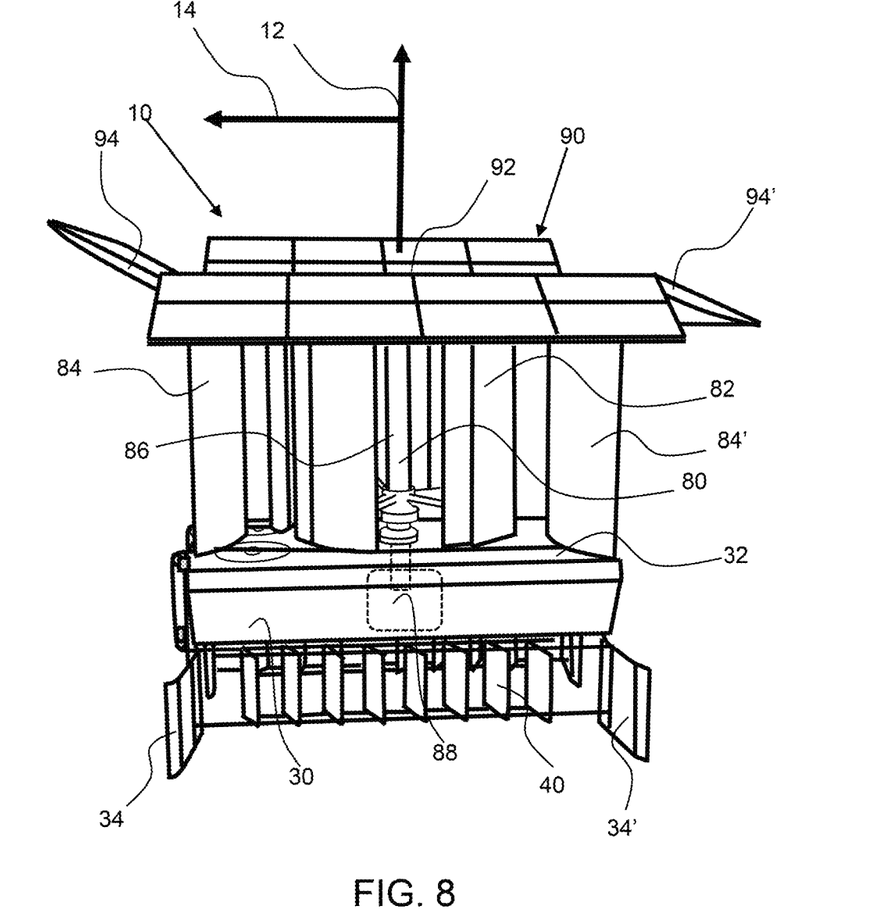
FIG. 8 shows a side view of the floating power generation system shown in FIG. 7 with side solar panels of the solar panel system pivoted for both improved sun exposure and power generation. The solar panels may also be moved or pivoted to direct airflow into the wind turbine for increased power generation from the wind turbine, such as at night when the solar panels are not generating power from the sun.

Referring now to FIGS. 7 and 8, an exemplary floating power generation system 10 may have additional electrical generator system coupled with the platform, such as on the top 32 of the platform 31. As shown, a wind turbine 80 is configured on the top side of the floating power generator and has turbine baffles 84 configured to direct airflow into the turbine blades 82 to produce electrical power from a wind turbine generator 88. The wind turbine generator may be electrically and/or physically coupled with one or more of the fin generators. The turbine blades 82 spin about a turbine shaft 86 that extends along a vertical axis 12. The top of the floating platform 31 may extend along a horizontal axis 14.

Also, as shown in FIGS. 7 and 8, may include a solar power system 90 having one or more solar panels for generating electrical power from photovoltaic cells, for example. The solar power system may have a central solar panel 92 configured on top of the wind turbine 80 and one or more side solar panels 94 that may be configured to tilt or pivot to produce better sun exposure to produce more electrical power.

Figure 9:
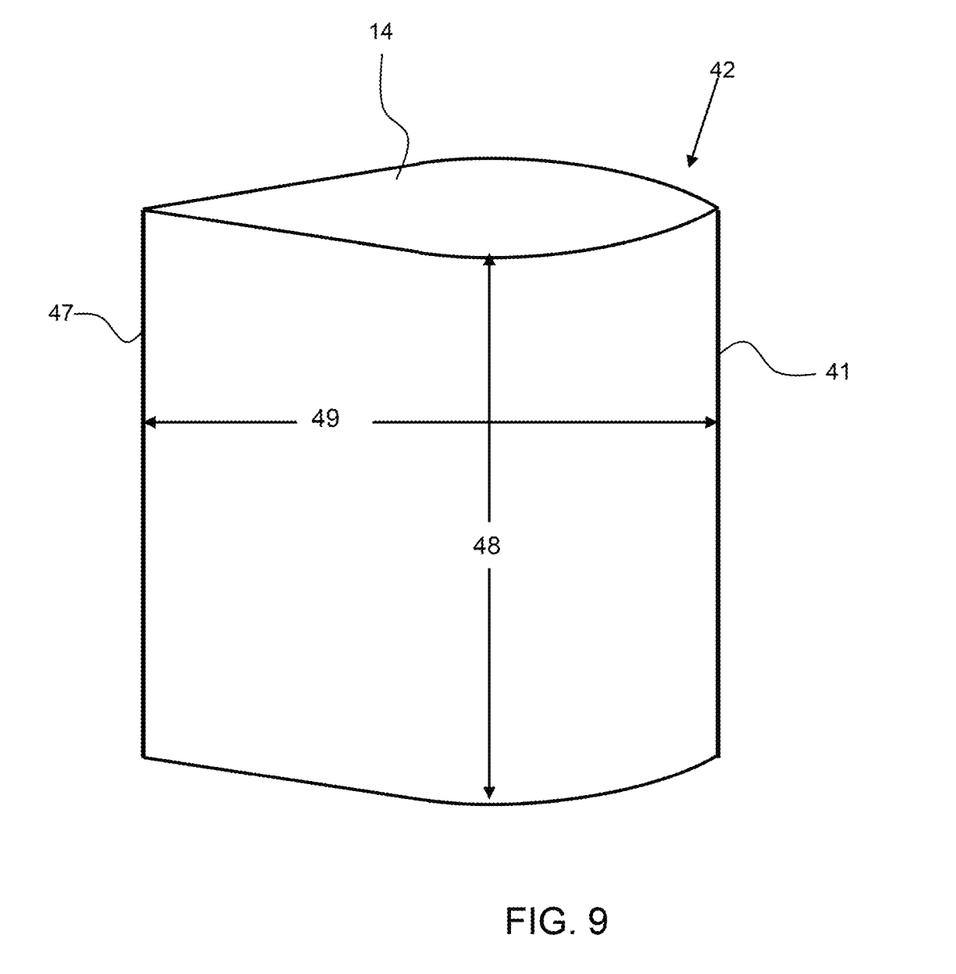
FIG. 9 shows a perspective view of a fin having a height from a bottom to a top and a length from a front end to a back end.

As shown in FIG. 9, a fin has a fin height 48 from a bottom to a top and a fin length 49 from a front end 41 to a back end 47.

It will be apparent to those skilled in the art that various modifications, combinations, and variations can be made in the present invention without departing from the scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. A floating power generation system comprising:
   a) a floating power generator comprising:
      i) a floating platform;
      ii) a first fin assembly coupled to the floating platform and comprising:
         a plurality of first fins that are configured to pivot from a flow of water from a first pivot position to a second pivot position; and
         a first fin-yoke cable coupled with the plurality of first fins and extending to a first flywheel;
      iii) a second fin assembly coupled to the floating platform and comprising:
         a plurality of second fins that are configured to pivot from said flow of water from a first pivot position to a second pivot position; and
         a second fin-yoke cable coupled with the plurality of second fins and extending to a second flywheel; and
      iv) an electrical generator configured on the floating platform and coupled to at least one of the first flywheel and second flywheel and configured to produce electrical power;
      wherein the plurality of first fins are configured to direct said flow of water into the plurality of second fins to cause the second fin to pivot to a second pivot position; and
      v) an actuator that is configured to move the first fins from a first pivot potion to a neutral position; and
      wherein the actuator is coupled to the first flywheel.

2. The floating power generation system of claim 1, wherein the actuator is a motor that receives electrical power from the electrical generator.

3. The floating power generation system of claim 1, wherein the electrical generator is a first electrical generator and is coupled with the first flywheel.

4. The floating power generation system of claim 3, further comprising a second electrical generator coupled to the second flywheel.

5. The floating power generation system of claim 1, wherein the plurality of first fins includes at least five first fins and wherein the plurality of second fins includes at least five second fins.

6. The floating power generation system of claim 1, wherein each of the plurality of first fins and plurality of second fins are configured between respective first rails and second rails.

7. The floating power generation system of claim 6, wherein each of the first fin assembly and second fin assembly comprise an actuating rail and wherein the respective actuating rail of the first fin assembly is coupled with the first fin-yoke cable, and wherein the respective actuating rail of the second fin assembly is coupled with the second fin-yoke cable.

8. The floating power generation system of claim 1, wherein each of the first fin assembly and second fin assembly comprise an actuating rail and wherein the respective actuating rail of the first fin assembly is coupled with the first fin-yoke cable, and wherein the respective actuating rail of the second fin assembly is coupled with the second fin-yoke cable.

9. The floating power generation system of claim 8, wherein each of the actuating rails of the first fin assembly and second fin assembly disengaged with the respective first fin-yoke cable and second fin-yoke cable when water flow rates exceed a maximum threshold speed.

10. The floating power generation system of claim 1, further comprising a first fin assembly support arm coupled to the fin assembly and a second fin assembly support arm coupled to the second fin assembly and wherein the first fin assembly is moved out of the water by actuation of the first fin assembly support arm and wherein the second fin assembly is moved out of the water by actuation of the second fin assembly support arm.

11. The floating power generation system of claim 10, wherein the first fin assembly support arm and second fin assembly support arm rotate to lift the respective first and second fin assemblies out of the water.

12. The floating power generation system of claim 1, further comprising a baffle extending from the floating platform and configured at least partially submerged in water during use to direct said water flow into the plurality of first fins.

13. The floating power generation system of claim 1, wherein each of a first side and a second side of the floating platform taper down along a wave angle of between 30 and 60 degrees.

14. The floating power generation system of claim 1, further comprising a wind turbine configured on the floating platform.

15. The floating power generation system of claim 14, wherein the wind turbine has a plurality of turbine blades that rotate about a turbine shaft that extends vertically from the floating platform.

16. The floating power generation system of claim 14, further comprising a plurality of turbine baffles configured around the wind turbine blades and configured to direct wind into the wind turbine.

17. The floating power generation system of claim 14, wherein the wind turbine is coupled with a second electrical generator.

18. The floating power generation system of claim 14, further comprising a solar power system comprising a solar panel coupled to the floating platform.

19. The floating power generation system of claim 18, wherein the solar panel is an actuating solar panel configured to direct wind into the wind turbine.

20. The floating power generation system of claim 1, further comprising a solar power system comprising a solar panel coupled to the floating platform.

21. The floating power generation system of claim 20 wherein the solar panel is an actuating solar panel configured to direct wind into the wind turbine.

22. A floating power generation system comprising:
    a) a floating power generator comprising:
       i) a floating platform;
       ii) a first fin assembly coupled to the floating platform and comprising:
          a plurality of first fins that are configured to pivot from a flow of water from a first pivot position to a second pivot position;
          a first fin-yoke cable coupled with the plurality of first fins and extending to a first flywheel;
       iii) a second fin assembly coupled to the floating platform and comprising:

a plurality of second fins that are configured to pivot from said flow of water from a first pivot position to a second pivot position;
a second fin-yoke cable coupled with the plurality of second fins and extending to a second flywheel:
iv) an electrical generator configured on the floating platform and coupled to at least one of the first flywheel and second flywheel and configured to produce electrical power;
wherein the plurality of first fins are configured to direct said flow of water into the plurality of second fins to cause the second fin to pivot to a second pivot position; and
wherein the first fin-yoke cable and second fin-yoke cable each form a loop extending around a first end and a second end of the floating platform and coupled with the respective first yoke and second yoke.

* * * * *